US012368269B2

United States Patent

(12) United States Patent
Kanbara
(10) Patent No.: US 12,368,269 B2
(45) Date of Patent: Jul. 22, 2025

(54) CONNECTOR HAVING CPA MEMBER FOR PARTLY COVERING A CODE

(71) Applicant: SUMITOMO WIRING SYSTEMS, LTD., Mie (JP)

(72) Inventor: Shota Kanbara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 354 days.

(21) Appl. No.: 17/903,552

(22) Filed: Sep. 6, 2022

(65) Prior Publication Data

US 2023/0079583 A1 Mar. 16, 2023

(30) Foreign Application Priority Data

Sep. 14, 2021 (JP) ................................. 2021-149067

(51) Int. Cl.
*H01R 13/641* (2006.01)

(52) U.S. Cl.
CPC .................................. *H01R 13/641* (2013.01)

(58) Field of Classification Search
CPC ........................ H01R 13/641; H01R 13/62955
See application file for complete search history.

(56) References Cited

U.S. PATENT DOCUMENTS 11,699,885 B1 * 7/2023 Pavlovic ............ H01R 13/6581 235/451
2017/0229813 A1 8/2017 Exenberger et al.
2019/0372262 A1 * 12/2019 Christiano ........... H01R 13/465
2021/0313731 A1 * 10/2021 Dawson ................. H01R 43/26

* cited by examiner

*Primary Examiner* — Michael C Zarroli
(74) *Attorney, Agent, or Firm* — Venjuris, P.C.

(57) ABSTRACT

A connector 1 includes: a connector housing 10 that includes a housing main body 10A that can be fitted to a mating connector 60, and a CPA holding portion 21 that is disposed on an outer surface of the housing main body 10A; a CPA member 40 that is attached to the CPA holding portion 21, and that can be moved from a standby position to a fitting assurance position when the housing main body 10A is in a fitting complete position relative to the mating connector 60; and a two-dimensional code 50 that is disposed on the outer surface of the housing main body 10A. A part of the two-dimensional code 50 is covered by the CPA member 40 when the CPA member 40 is in the standby position, and the entire two-dimensional code 50 is exposed when the CPA member 40 is in the fitting assurance position.

7 Claims, 20 Drawing Sheets

CONNECTOR HAVING CPA MEMBER FOR PARTLY COVERING A CODE

CROSS-REFERENCE TO RELATED APPLICATIONS

This application is based on and claims priority from Japanese Patent Application No. 2021-149067, filed on Sep. 14, 2021, with the Japan Patent Office, the disclosure of which is incorporated herein in its entirety by reference.

TECHNICAL FIELD

The technique disclosed by the present specification relates to a connector.

BACKGROUND

Conventionally, a connector provided with a fitting detection function for detecting whether or not male and female housings are properly fitted together is known. For example, such a connector includes a connector housing, a lever that assists the fitting of the connector housing and a mating connector to one another, a position assurance lock that can be moved from a release position to an engagement position when the lever is in a fitting complete position, and an identifier that is affixed to the connector housing. The identifier is covered by the position assurance lock when the position assurance lock is in the release position, and is exposed from the position assurance lock and can be accessed using a reading device or the like when the position assurance lock is in the engagement position. The completion of the fitting of the connector housing and the mating connector to one another is detected and recorded by the exposed identifier being accessed. JP 2017-162797A is an example of related art.

SUMMARY

In the above-described configuration, the entire identifier is covered when the position assurance lock is in the release position, and thus, work efficiency may decrease due to the worker carrying out the work for fitting the connector not being able to find out where the identifier is and being confused.

A connector disclosed by the present specification includes: a connector housing that includes a housing main body that can be fitted to a mating connector, and a holding portion that is disposed on an outer surface of the housing main body; a fitting assurance member that is attached to the holding portion, and that can be moved from a standby position to a fitting assurance position when the housing main body is in a fitting complete position relative to the mating connector; and an identifier that is disposed on one of the outer surface of the housing main body and an outer surface of the fitting assurance member, wherein a part of the identifier is covered by the other one of the holding portion and the fitting assurance member when the fitting assurance member is in the standby position, and the entire identifier is exposed when the fitting assurance member is in the fitting assurance position.

The connector disclosed by the present specification improves work efficiency.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
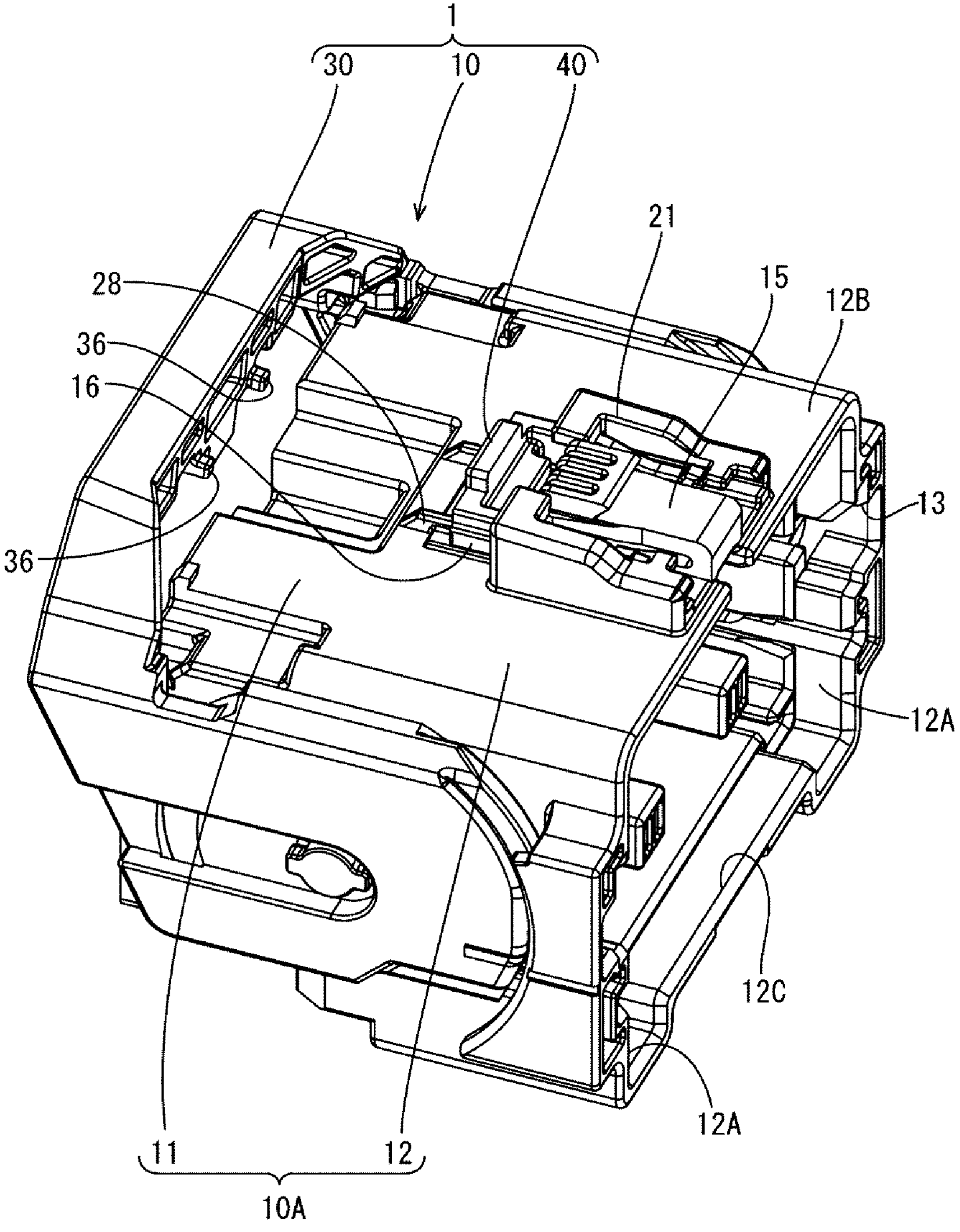
FIG. 1 is a perspective view of a connector according to embodiment 1.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Overview of Embodiments (1) A connector disclosed by the present specification includes: a connector housing that includes a housing main body that can be fitted to a mating connector, and a holding portion that is disposed on an outer surface of the housing main body; a fitting assurance member that is attached to the holding portion, and that can be moved from a standby position to a fitting assurance position when the housing main body is in a fitting complete position relative to the mating connector; and an identifier that is disposed on one of the outer surface of the housing main body and an outer surface of the fitting assurance member, wherein a part of the identifier is covered by the other one of the holding portion and the fitting assurance member when the fitting assurance member is in the standby position, and the entire identifier is exposed when the fitting assurance member is in the fitting assurance position.

According to the above-described configuration, the identifier can be read when the fitting assurance member is in the fitting assurance position, and thus the state in which the connector has been properly fitted to the mating connector can be accurately detected and recorded. Furthermore, when the fitting assurance member is in the standby position, the identifier can be partially seen although the identifier cannot be read. Thus, a worker can carry out work while checking the identifier with his/her eyes, and work efficiency is improved.

(2) In the connector according to (1) above, the ratio of the area of the portion of the identifier that is exposed when the fitting assurance member is in the standby position may be more than 50% and 90% or less relative to the entire area of the identifier.

If the area of the exposed portion of the identifier is more than 50%, a worker can easily check the identifier with his/her eyes, and work efficiency is improved. Furthermore, if the area of the exposed portion of the identifier is 90% or less, the identifier definitely cannot be read, and thus a situation can be avoided in which the identifier is read even though the fitting of the connector to the mating connector is incomplete.

(3) In the connector according to (1) or (2) above, the fitting assurance member may include an operation portion that is operated to move the fitting assurance member from the standby position to the fitting assurance position, and the identifier may be disposed on the outer surface of the housing main body so as to be positioned adjacent to the operation portion.

According to such a configuration, when moving the fitting assurance member from the standby position to the fitting assurance position, a worker can more easily carry out the work while looking at the identifier, and work efficiency is reliably improved.

(4) In the connector according to (1) or (2) above, the identifier may be disposed on the fitting assurance member, and the holding portion may include a holding wall that sandwiches and holds the fitting assurance member between the housing main body and itself, and that covers a part of the identifier when the fitting assurance member is in the standby position.

According to such a configuration, a holding wall that is included in the holding portion and that is for holding the fitting assurance member is used to cover the identifier, and thus the configuration of the holding portion can be prevented from becoming complicated.

Details of Embodiments

In the following, specific examples of the technique disclosed by the present specification will be described with reference to the drawings. Note that the present invention is not limited to these examples, and is intended to include all modifications that are indicated by the claims and are within the meaning and scope of equivalents of the claims.

Embodiment 1

Embodiment 1 will be described with reference to FIGS. 1 to 18. A connector 1 according to the present embodiment is a lever-type connector that fits to a mating connector 60 that has cam followers 62, and as illustrated in FIG. 1, includes a connector housing 10 that includes a CPA holding portion 21 (one example of the holding portion), a lever 30 that is attached to this connector housing 10, and a connector position assurance (CPA) member 40 (one example of the fitting assurance member) that is attached to the CPA holding portion 21 and that assures a state in which the connector 1 and the mating connector 60 are fitted to one another. The CPA member 40 can slide and move between a standby position (the position illustrated in FIG. 3) in which a part thereof projects from the CPA holding portion 21, and a fitting assurance position (the position illustrated in FIG. 17) in which the entirety thereof is housed inside the CPA holding portion 21.

[Connector Housing 10]

Figure 2:
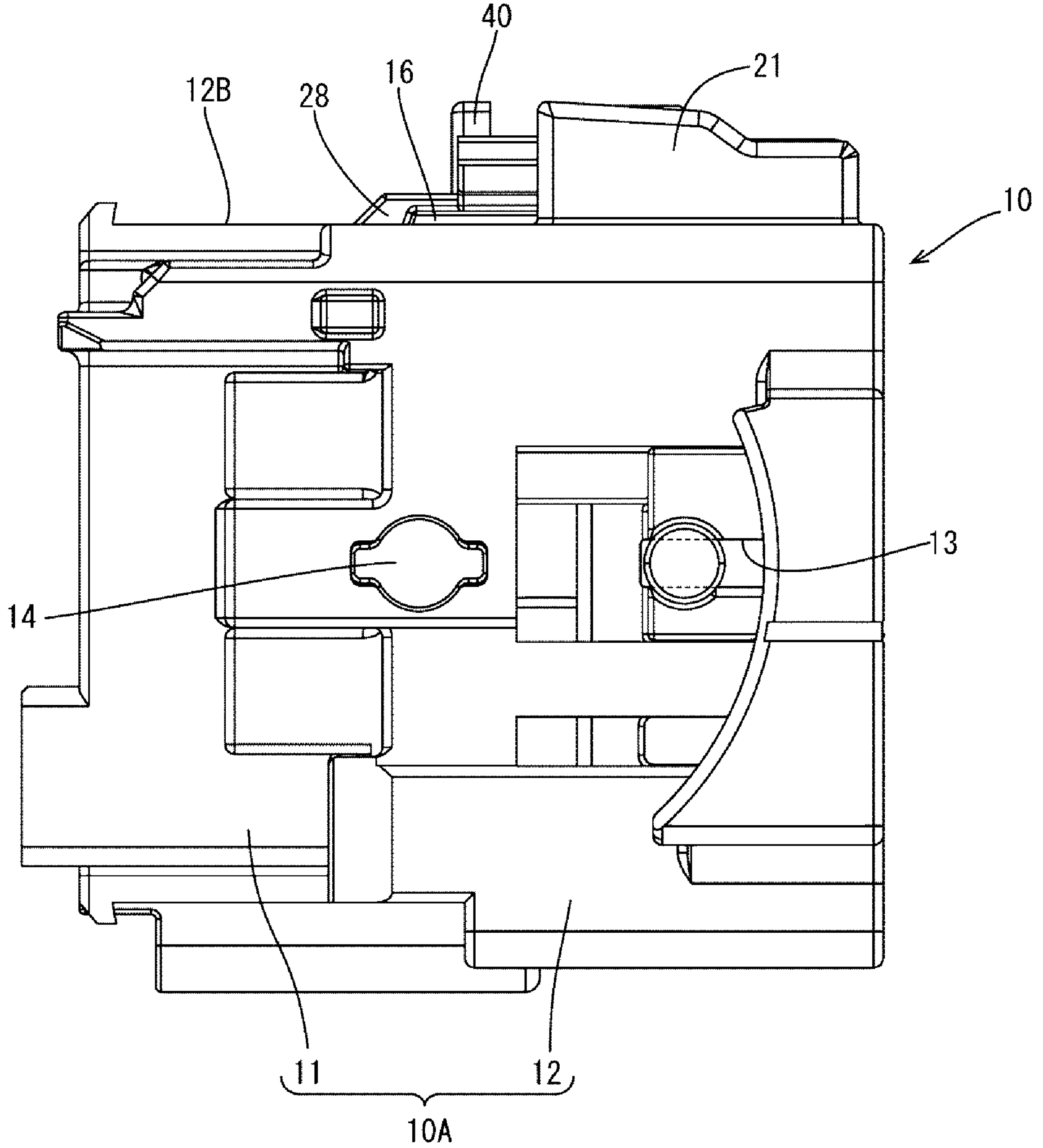
FIG. 2 is a side view of a connector housing in a state in which a CPA member has been attached thereto in embodiment 1.
Figure 3:
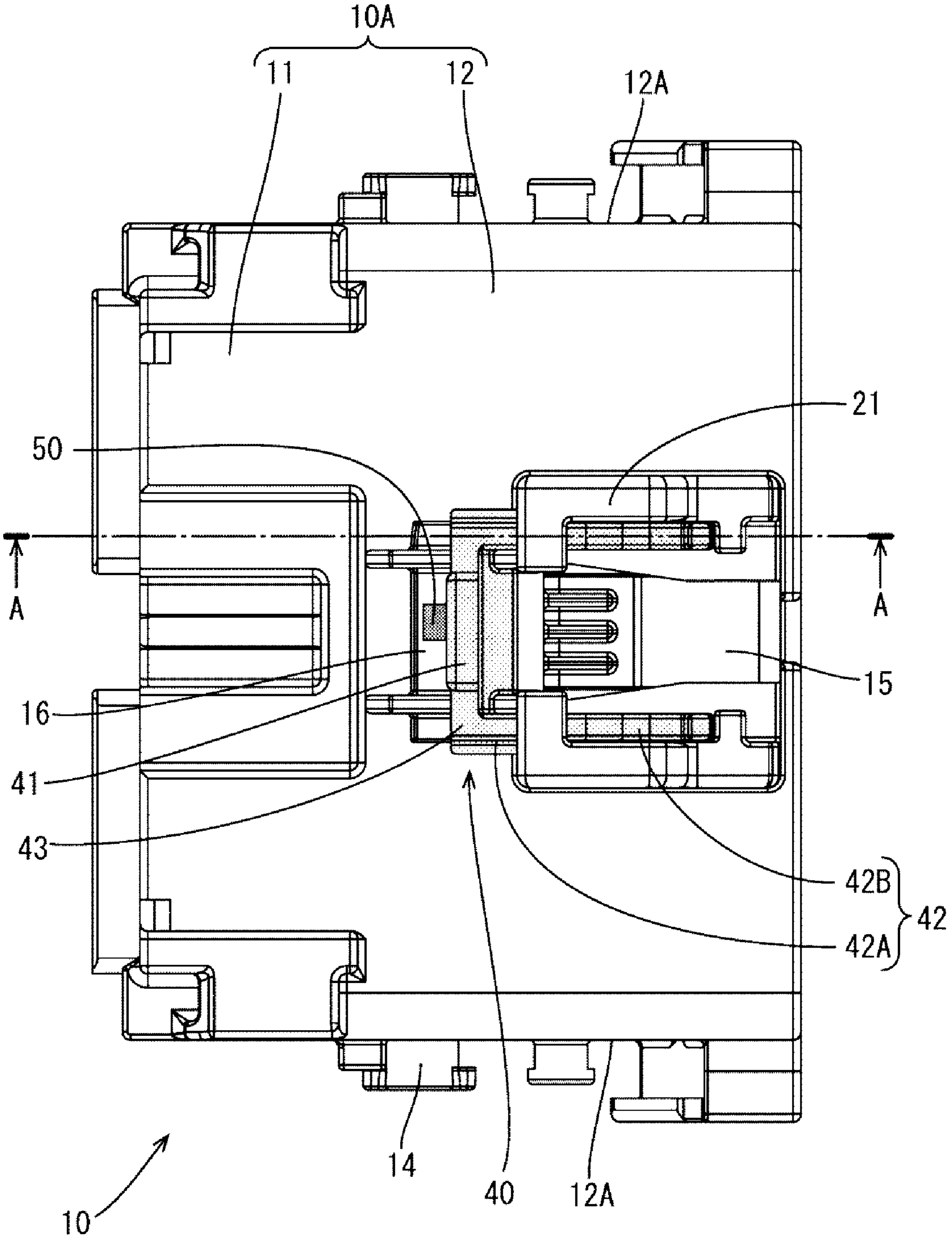
FIG. 3 is a plan view of the connector housing in the state in which the CPA member has been attached thereto in embodiment 1.

The connector housing 10 is made of synthetic resin, and, as illustrated in FIGS. 1, 2, and 3, includes a housing main body 10A that can be fitted to the mating connector 60, two turning shafts 14, and a lock arm 15.

The housing main body 10A includes a block-shaped terminal holding portion 11 that holds a terminal fitting, and a hood portion 12 that extends from this terminal holding portion 11 and receives the mating connector 60 in the inside thereof. As illustrated in FIG. 1, the hood portion 12 has the shape of a rectangular column having a connector inlet 12C that the mating connector 60 can advance into, and includes two mutually-parallel mounting walls 12A, a lock wall 12B that connects the two mounting walls 12A, and a mount portion 16 that is disposed on the outer surface of the lock wall 12B. Each of the two mounting walls 12A extends from the rim of the connector inlet 12C, and has a receiving groove 13 that a cam follower 62 of the mating connector 60 can advance into.

Figure 5:
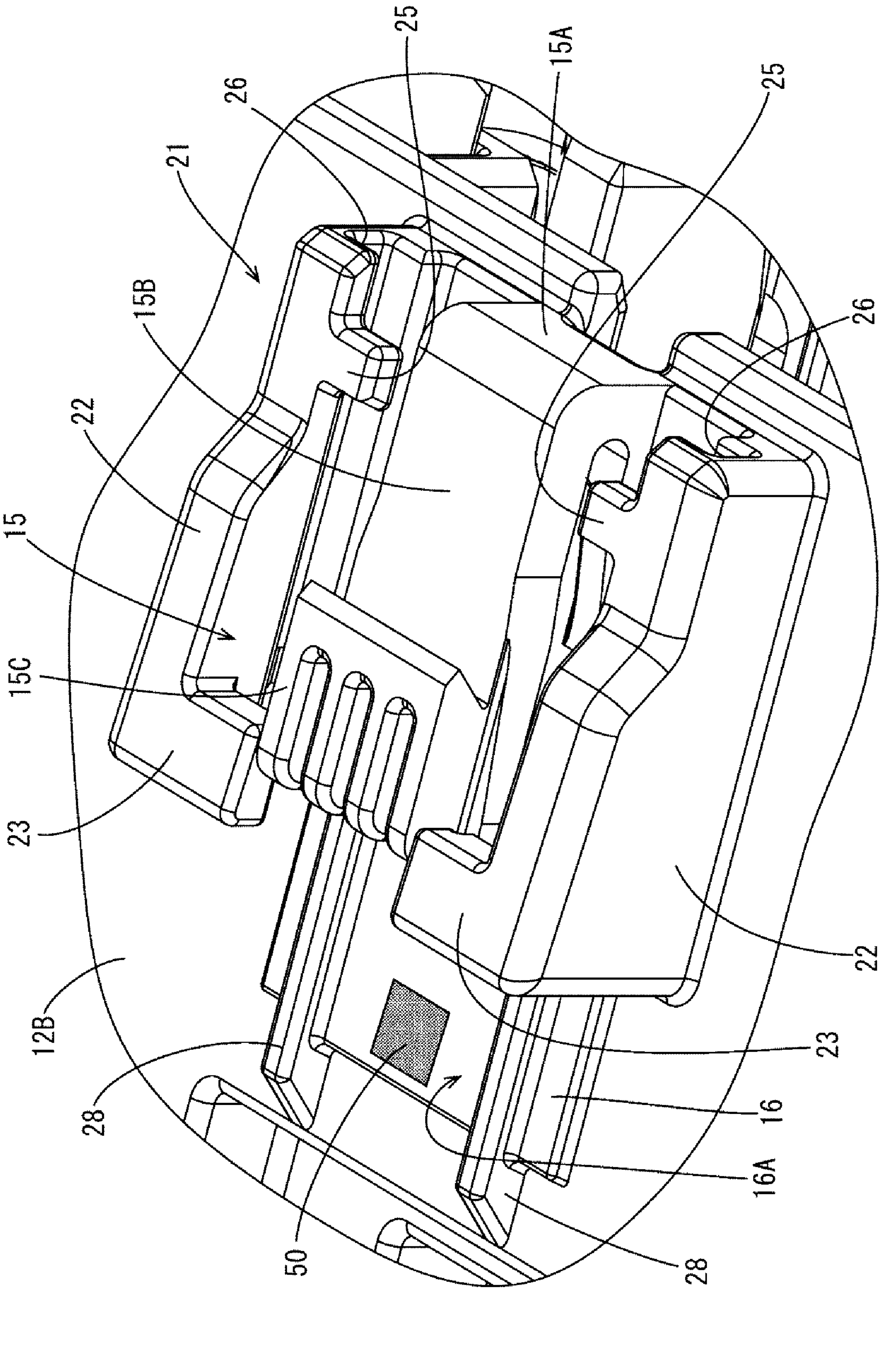
FIG. 5 is a partially enlarged perspective view illustrating, in an enlarged state, the vicinity of a CPA holding portion in the connector housing according to embodiment 1.
Figure 6:
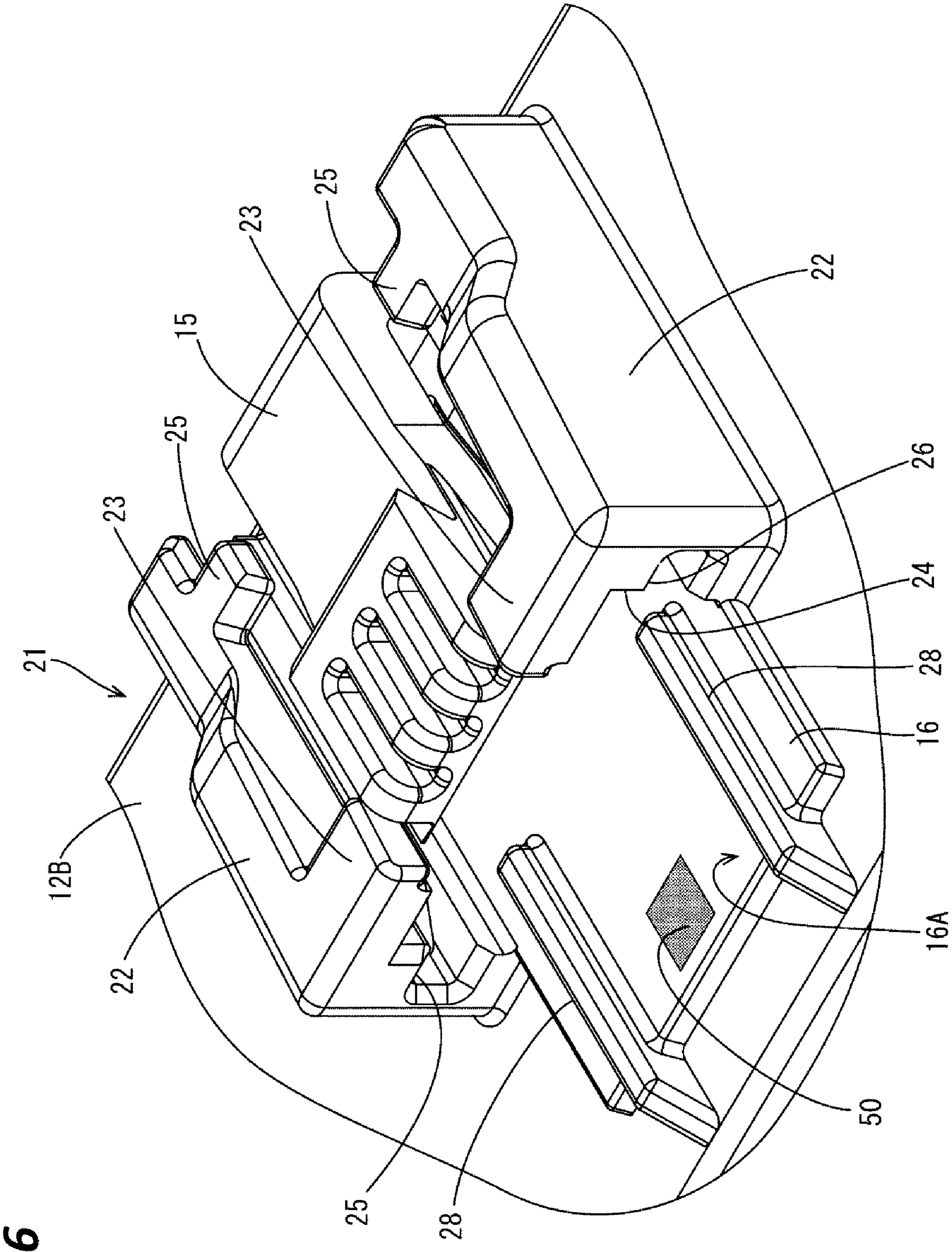
FIG. 6 is a partially enlarged perspective view illustrating, in an enlarged state from a direction that is different from that in FIG. 5, the vicinity of the CPA holding portion in the connector housing according to embodiment 1.

As illustrated in FIGS. 5 and 6, the mount portion 16 has the shape of a flat base that slightly projects from the outer surface of the lock wall 12B.

As illustrated in FIGS. 2 and 3, the two turning shafts 14 have substantially cylindrical shapes, and are respectively disposed on the outer surfaces of the two mounting walls 12A.

As illustrated in FIG. 5, the lock arm 15 includes a lock base portion 15A that extends from one end of the mount portion 16, a plate-spring-shaped lock plate 15B that continues from the lock base portion 15A and extends along the mount portion 16, and a lock claw 15C that projects from the lock plate 15B. One end of the lock plate 15B that is connected to the lock base portion 15A is the base end, and the opposite side of the lock plate 15B is a free end. The lock plate 15B can bend toward and away from the mount portion 16.

[CPA Holding Portion 21]

Figure 7:
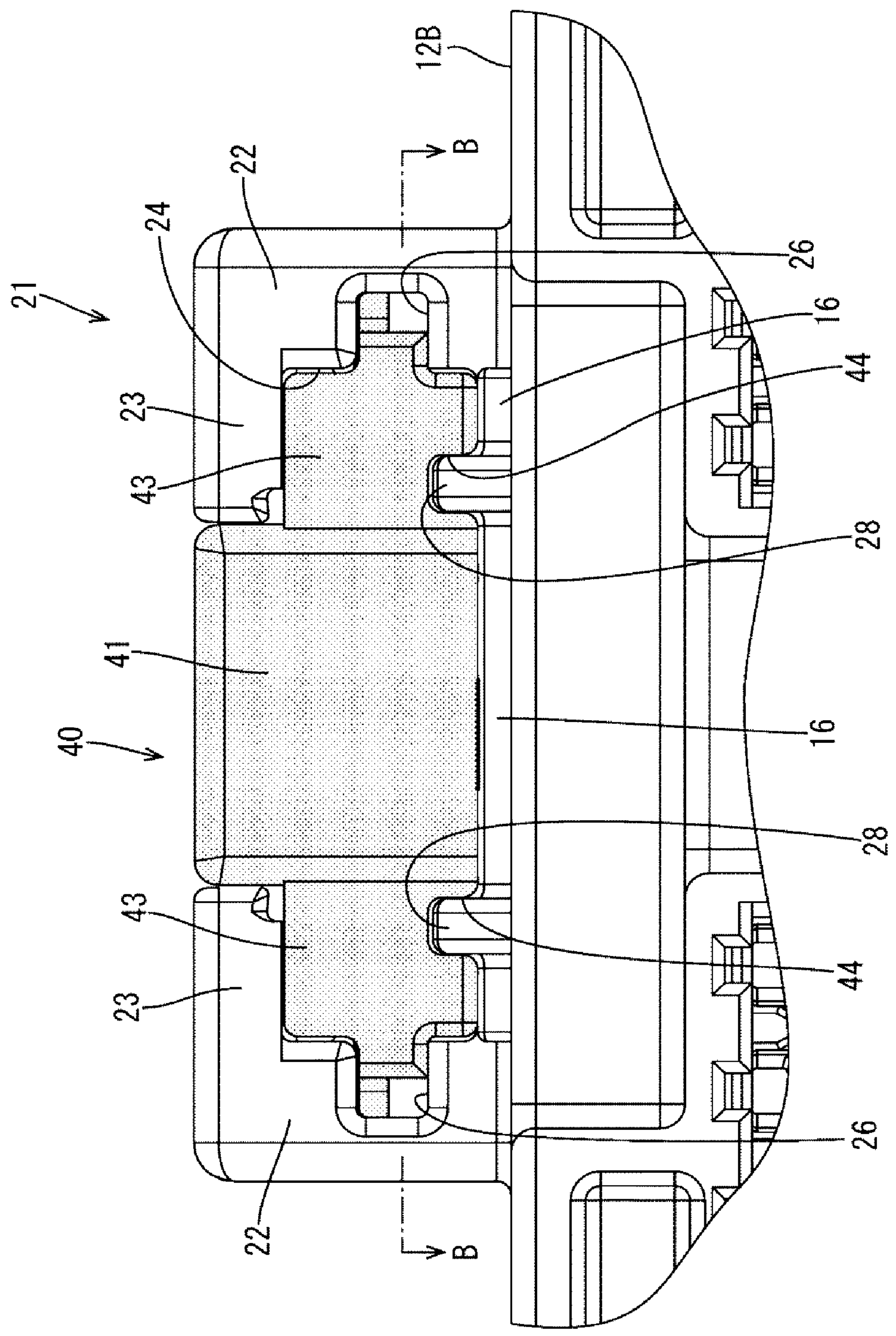
FIG. 7 is a partially enlarged rear view illustrating, in an enlarged state, the vicinity of the CPA holding portion in the connector housing according to embodiment 1 in the state in which the CPA member has been attached thereto.

As illustrated in FIGS. 5, 6, and 7, the CPA holding portion 21 is disposed on the outer surface of the lock wall 12B. The CPA holding portion 21 includes side walls 22, two holding walls 23, two first restricting protrusions 25, and two guide rails 28.

The two side walls 22 are erected from the lock wall 12B, and are disposed on both sides of mount portion 16 and the lock arm 15. The two holding walls 23 each extend inward (toward the other side wall 22) from one end that is close to the free end of the lock arm 15 in each of the two side walls 22. The holding walls 23 are each disposed across a gap from the mount portion 16. The space that is defined by the side walls 22, the holding walls 23, and the mount portion 16 is a CPA insertion port 24 that allows the CPA member 40 to advance into the CPA holding portion 21. A part of the mount portion 16 is disposed so as to project to the outside of the CPA holding portion 21 from the CPA insertion port 24.

The two first restricting protrusions 25 are each disposed across a gap from the lock wall 12B near an end portion on the opposite side from the holding walls 23 in each of the two side walls 22.

Figure 8:
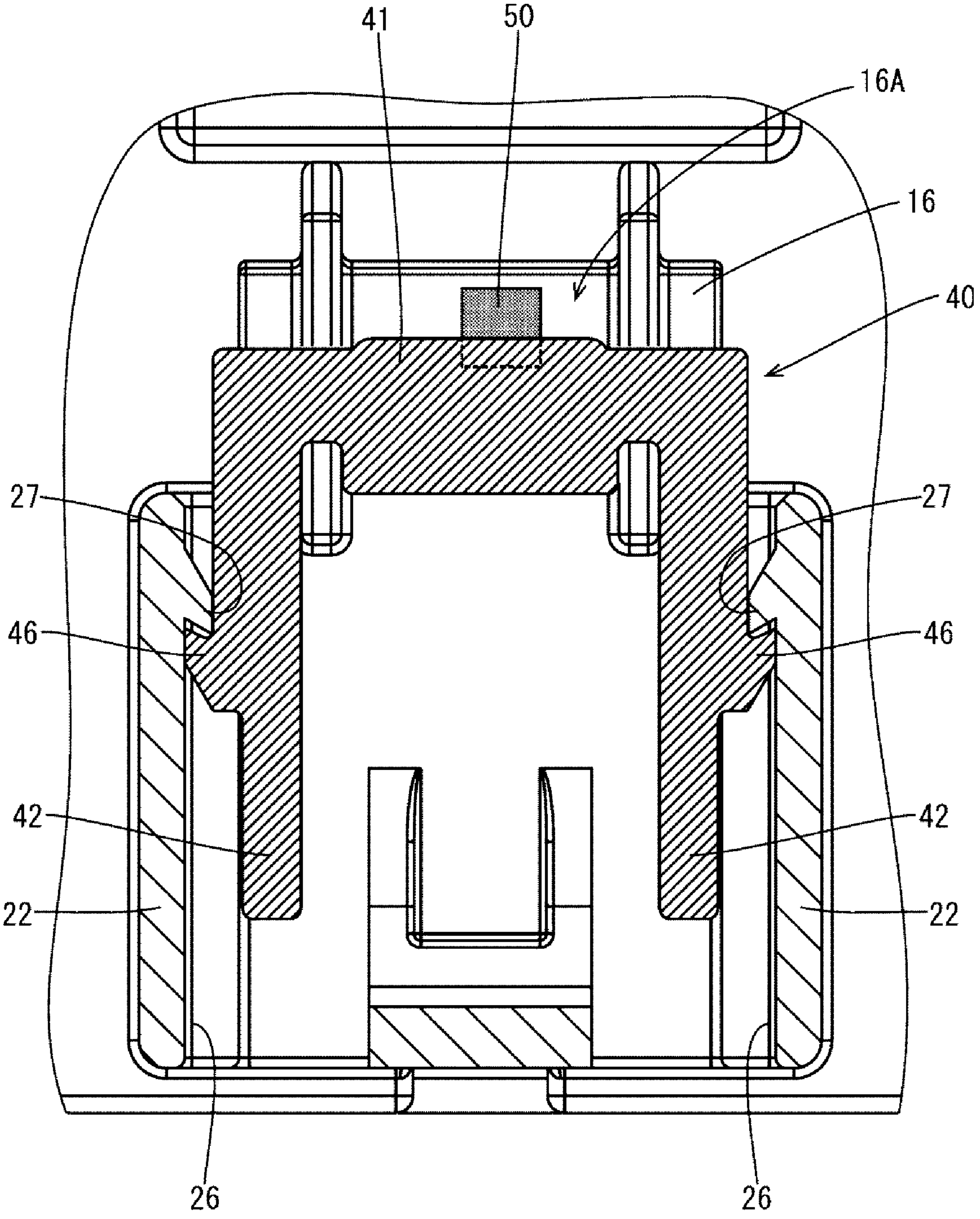
FIG. 8 is a cross-sectional view taken along line B-B in FIG. 7.

The two side walls 22 have guide grooves 26 that extend along the side edges of the lock arm 15. As illustrated in FIG. 8, first locking protrusions 27 are provided in a projecting state inside the guide grooves 26.

As illustrated in FIGS. 5 and 6, the two guide rails 28 are linear projections that project from the lock wall 12B and the mount portion 16, and extend in parallel with the two side walls 22. One end portion of each guide rail 28 is disposed inside the CPA insertion port 24, and the remaining large portion of each guide rail 28 is disposed so as to project to the outside of the CPA holding portion 21.

[Lever 30]

Figure 9:
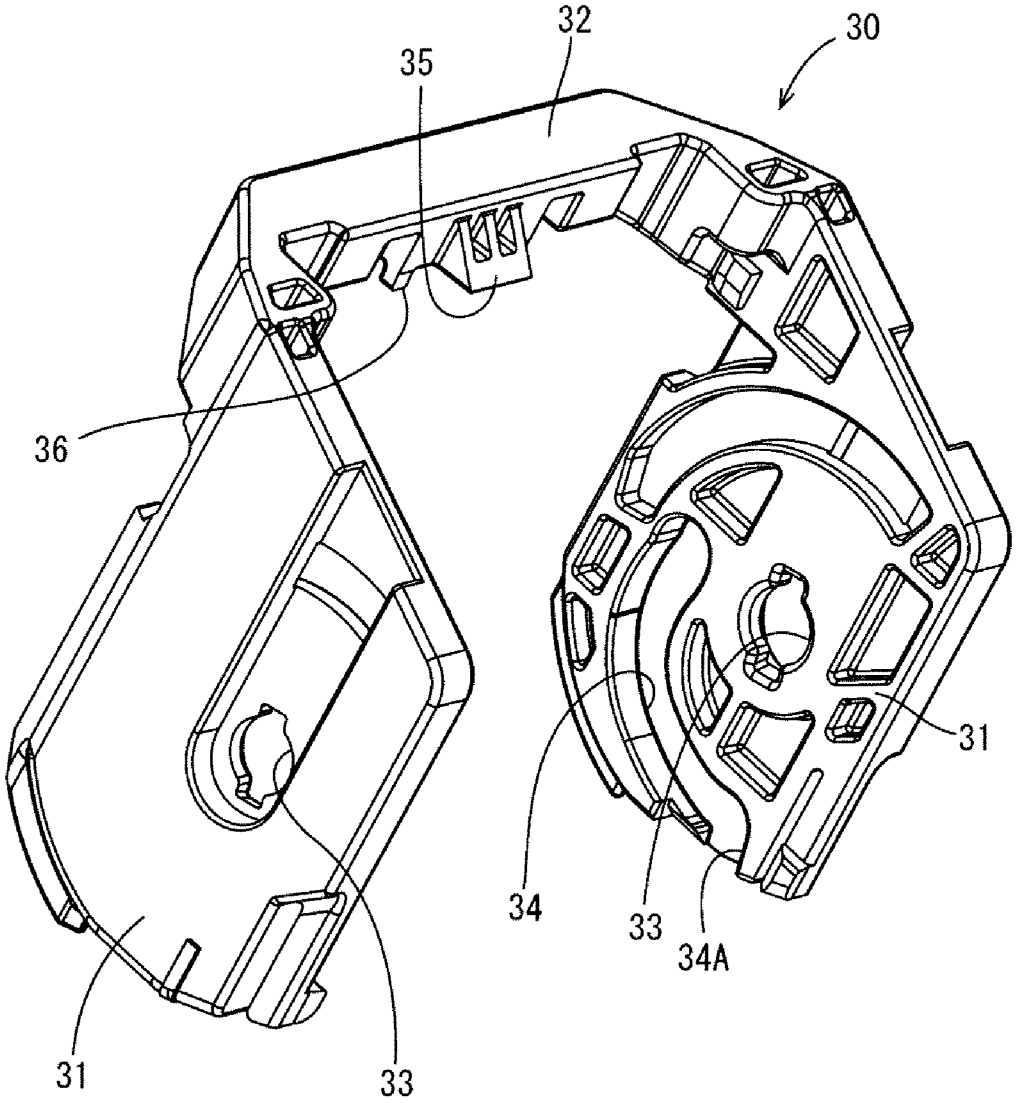
FIG. 9 is a perspective view of a lever according to embodiment 1.

The lever 30 is a member for assisting the fitting and the detaching of the connector housing 10 and the mating connector 60 to and from one another by utilizing the principle of leverage. The lever 30 is made of synthetic resin, and as illustrated in FIG. 9, is a substantially U-shaped member including two cam plates 31, and a turning operation portion 32 that connects these two cam plates 31.

The two cam plates 31 each include a shaft hole 33 that receives a turning shaft 14, and a cam groove 34 that receives a cam follower 62. The shaft hole 33 is a substantially circular hole that penetrates the cam plate 31. The cam groove 34 is a groove that is disposed in the surface of the cam plate 31 facing the connector housing 10, and includes, at an outer edge of the cam plate 31, a cam inlet 34A that allows the cam follower 62 to advance into the cam groove 34. The cam groove 34 has a substantially arcuate shape such that the cam groove 34 gradually approaches the shaft hole 33, which is the center about which the cam plate 31 turns, at positions further toward the inner side from the cam inlet 34A.

The lever 30 includes two release protrusions 36 and a lock portion 35 projecting from the turning operation portion 32. As illustrated in FIG. 9, the lock portion 35 is a protrusion that is disposed at the center position between both ends of the turning operation portion 32 and that tapers as the distance from the turning operation portion 32 increases. As illustrated in FIGS. 1 and 9, the two release protrusions 36 are disposed at both sides of the lock portion 35.

As illustrated in FIG. 1, the lever 30 is mounted so as to extend across the connector housing 10, with the cam plates 31 being disposed along the mounting walls 12A and the turning shafts 14 being fitted into the shaft holes 33. The lever 30 is pivotally supported so that the lever 30 can turn about the turning shafts 14 between a fitting start position (the position illustrated in FIGS. 1 and 12) and a fitting complete position (the position illustrated in FIG. 13) in which the mating connector 60 is fitted to the connector housing 10 in the proper fitting position.

[CPA Member 40]

Figure 10:
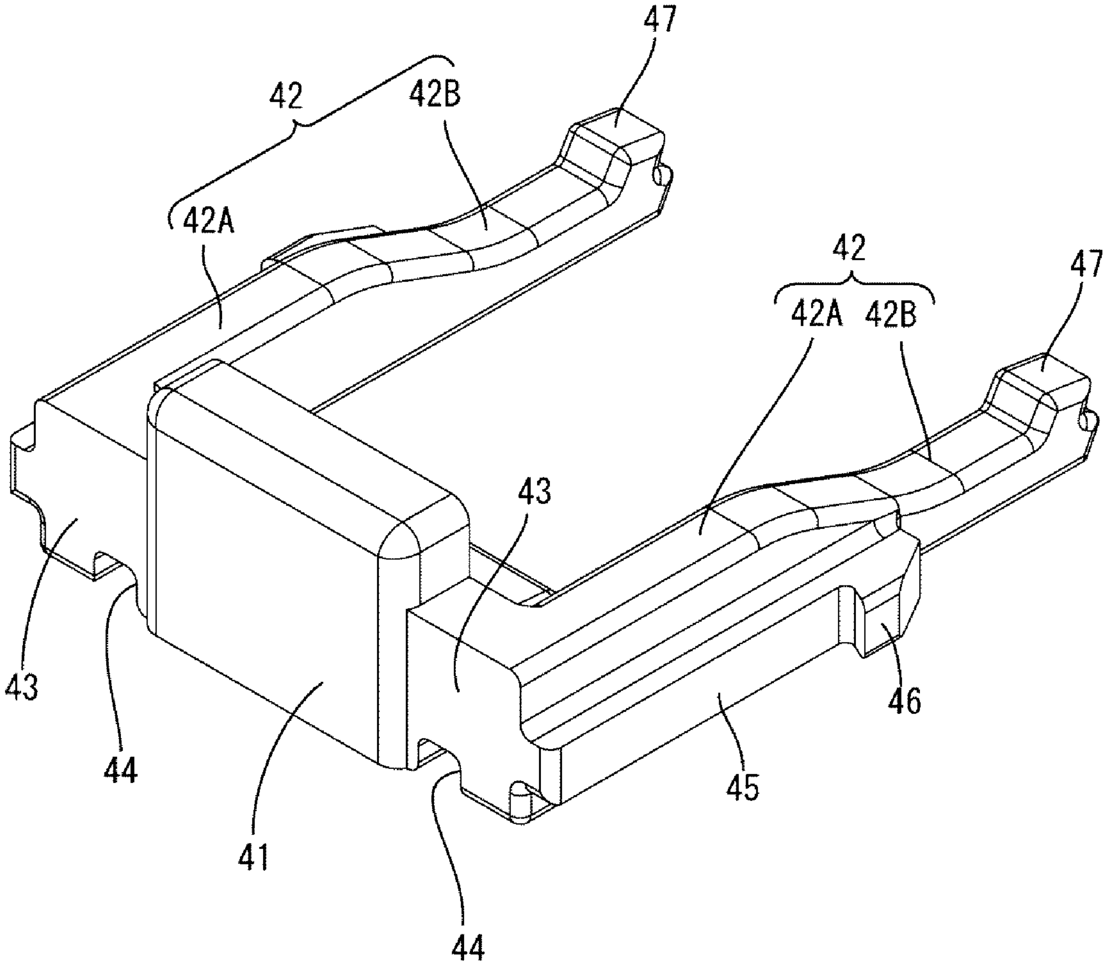
FIG. 10 is a perspective view of the CPA member according to embodiment 1.

As illustrated in FIG. 10, the CPA member 40 includes a push operation portion 41 (one example of the operation portion), two arm connection portions 43 that are disposed at both sides of the push operation portion 41, and two arms 42 that extend from the arm connection portions 43, and is U-shaped as a whole. The push operation portion 41 has the shape of a thick plate. The two arm connection portions 43 have guide recesses 44 that receive the guide rails 28. The two arms 42 extend in parallel to one another, and are disposed between the two side walls 22 and the lock arm 15. Each of the arms 42 has the shape of a bar as a whole; half of the arm 42 that is adjacent to the arm connection portion 43 constitutes an arm base portion 42A, and half of the arm 42 that is located further toward the tip than the arm base portion 42A is constitutes a bending portion 42B that is thinner than the arm base portion 42A and is allowed to undergo deformation by bending.

The CPA member 40 includes two guide ribs 45, two second locking protrusions 46, and two second restricting protrusions 47. The two guide ribs 45 are linear, and project outward from the arm connection portions 43 and the arm base portions 42A to be housed inside the guide grooves 26. The second locking protrusions 46 are protrusions that project further outward from the guide ribs 45; the second locking protrusions 46 are disposed inside the guide grooves 26 and can engage with the first locking protrusions 27. The second restricting protrusions 47 are disposed at the tips of the bending portions 42B; the second restricting protrusions 47 project toward the direction opposite from the lock wall 12B (upward in FIG. 4), and can engage with the first restricting protrusions 25.

Figure 4:
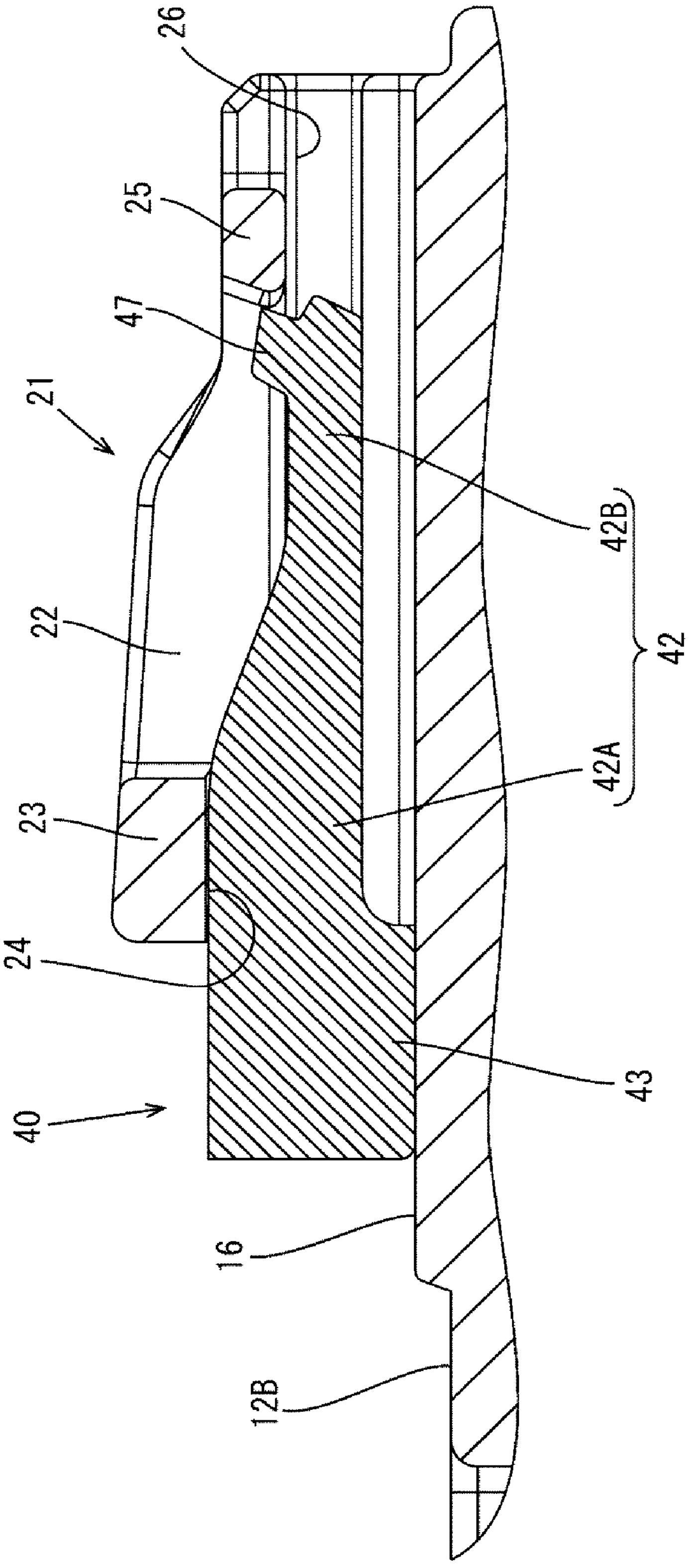
FIG. 4 is a cross-sectional view taken along line A-A in FIG. 3.

When the CPA member 40 is in the standby position, the push operation portion 41, the arm connection portions 43, and parts of the arm base portions 42A project from the CPA insertion port 24 to the outside (the left side in FIG. 3) of the CPA holding portion 21, as illustrated in FIG. 3. As illustrated in FIG. 8, by engaging with the first locking protrusions 27, the second locking protrusions 46 restrict the CPA member 40 from projecting from the CPA holding portion 21 any further than a predetermined amount and restrict the CPA member 40 from being detached from the CPA holding portion 21. As illustrated in FIG. 4, by engaging with the first restricting protrusions 25, the second restricting protrusions 47 restrict the CPA member 40 from moving to the fitting assurance position. As illustrated in FIG. 4, the holding walls 23 hold the arm base portions 42A in a state such that the arm base portions 42A are sandwiched between the mount portion 16 and the holding walls 23, and thus the CPA member 40 is restricted from moving in a floating fashion from the connector housing 10.

Figure 17:
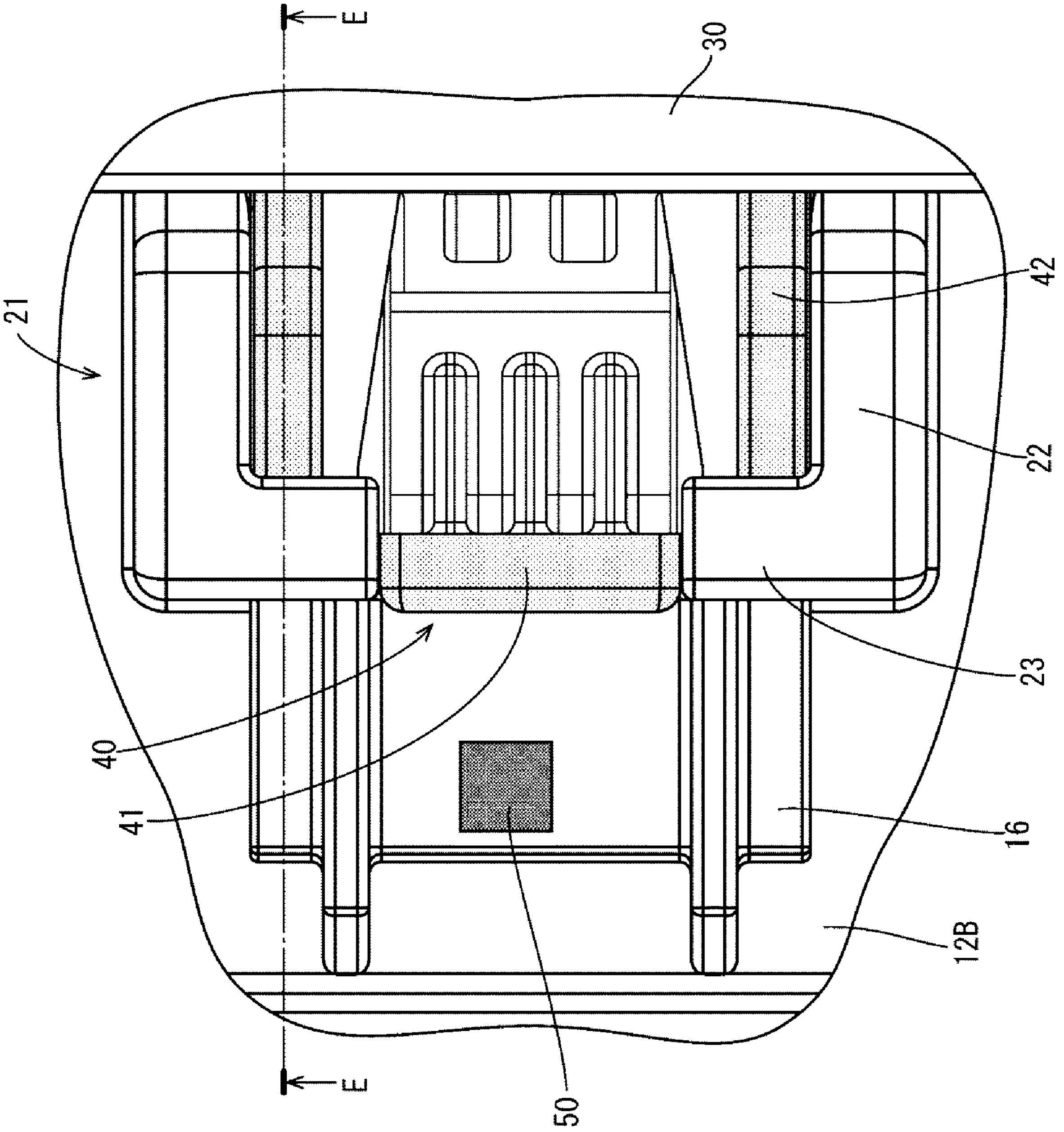
FIG. 17 is a partially enlarged plan view illustrating a state in which the fitting of the connector and the mating connector according to embodiment 1 to one another has been completed, and the CPA member is in a fitting assurance position.
Figure 18:
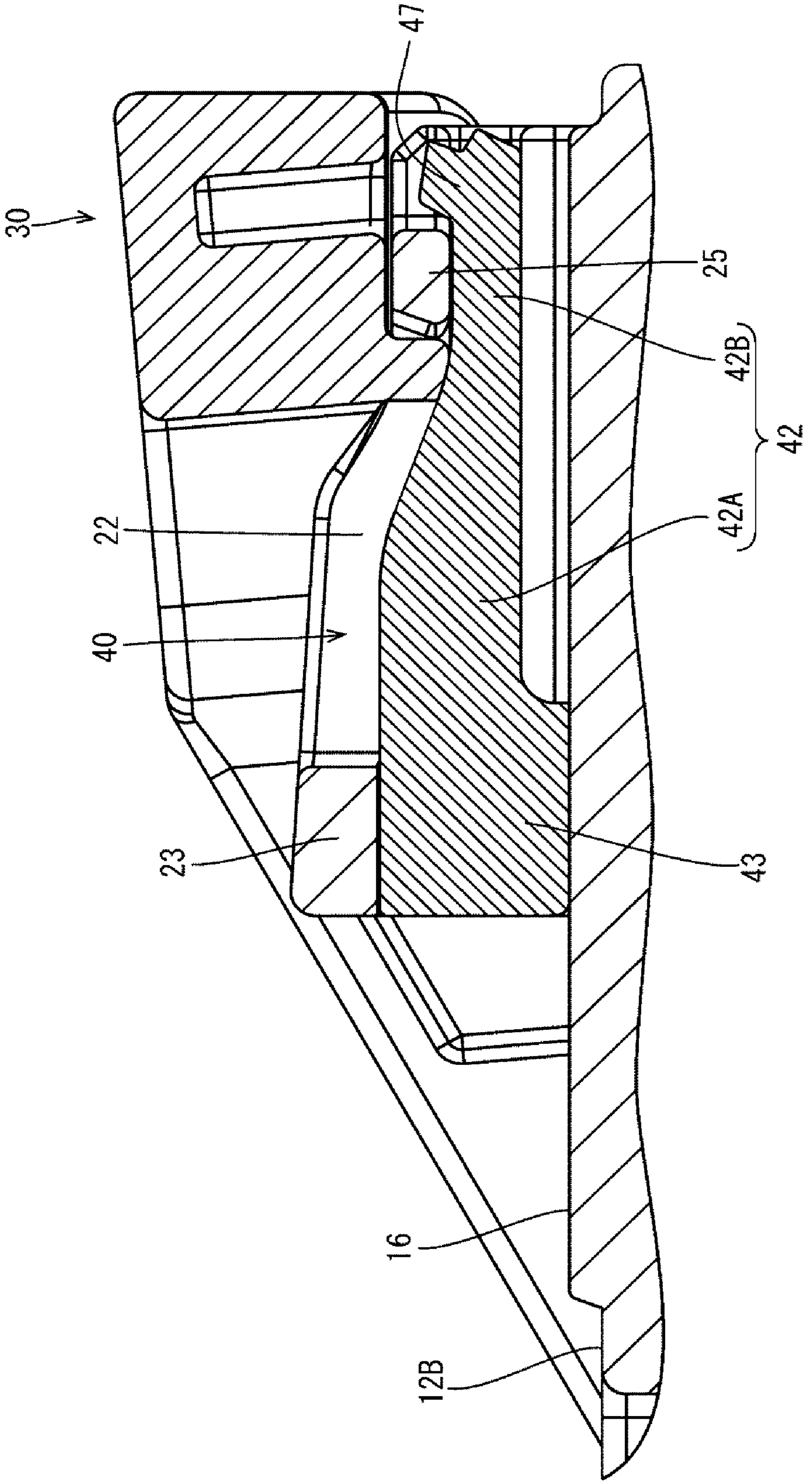
FIG. 18 is a cross-sectional view taken along line E-E in FIG. 17.

When the CPA member 40 is in the fitting assurance position, the entire CPA member 40 is housed inside the CPA holding portion 21, as illustrated in FIGS. 17 and 18.

[Two-Dimensional Code 50]

As illustrated in FIGS. 5 and 6, a part of the mount portion 16 is disposed so as to project to the outside of the CPA holding portion 21, and has a portion that is adjacent to the CPA insertion port 24. In this portion, the outer surface that is parallel with the lock wall 12B is a code arrangement surface 16A. A two-dimensional code 50 (one example of the identifier) is disposed on the code arrangement surface 16A. For example, information such as "fitting complete" and "lot number" is recorded in the two-dimensional code 50. For example, the two-dimensional code 50 can be formed by performing laser printing on the surface of the code arrangement surface 16A.

[Mating Connector 60]

Figure 11:
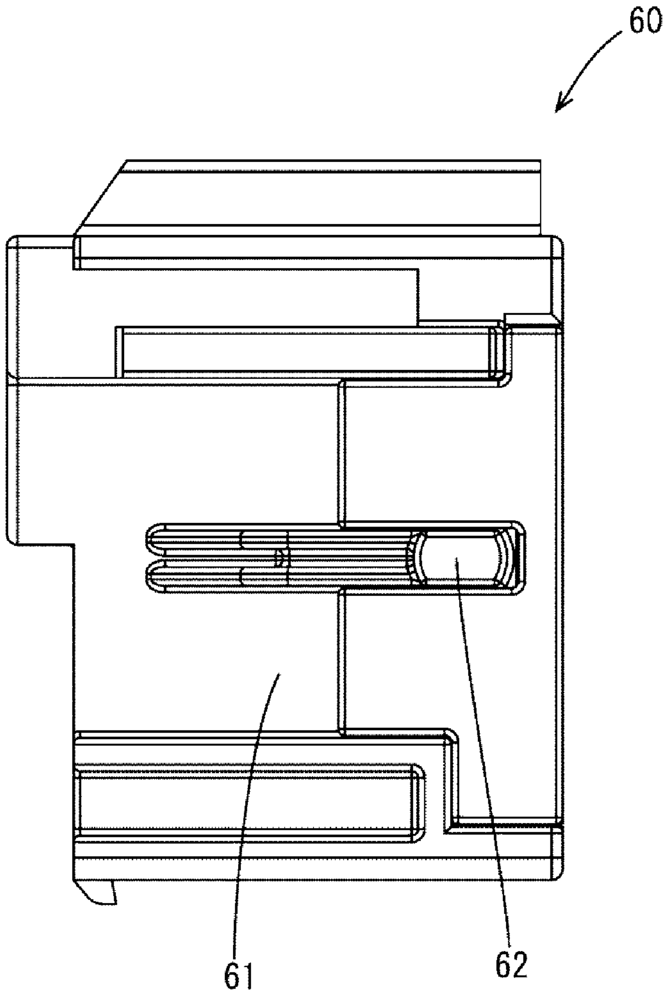
FIG. 11 is a side view of a mating connector according to embodiment 1.

As illustrated in FIG. 11, the mating connector 60 includes a block-shaped mating housing 61 that holds a mating terminal fitting, and the two cam followers 62, which are disposed on the outer surface of the mating housing 61.

[Fitting of Connector 1 and Mating Connector 60 to One Another]

In a state in which the connector 1 is not fitted to the mating connector 60, the lever 30 is held in the fitting start position, and the CPA member 40 is held in the standby position, as illustrated in FIG. 1. In the state in which the CPA member 40 is in the standby position, the push operation portion 41 is positioned above the code arrangement surface 16A, as illustrated in FIGS. 3 and 8. A part of the two-dimensional code 50 is concealed by the push operation portion 41, and the remaining portion of the two-dimensional code 50 is exposed and can be seen. When the CPA member 40 is in the standby position, the movement of the CPA member 40 in the direction in which the CPA member 40 projects from the CPA holding portion 21 is restricted by the second locking protrusions 46 engaging with the first locking protrusions 27, as illustrated in FIG. 8, and the movement of the CPA member 40 to the fitting assurance position is restricted by the second restricting protrusions 47 engaging with the first restricting protrusions 25, as illustrated in FIG. 4. Thus, it is ensured that the ratio of the area of the exposed portion of the two-dimensional code 50 is more than 50% and 90% or less relative to the entire area of the two-dimensional code 50. If the area of the exposed portion of the two-dimensional code 50 is more than 50%, a worker can easily check the two-dimensional code 50 with his/her eyes, and work efficiency is improved. Furthermore, if the area of the exposed portion of the two-dimensional code 50 is 90% or less, the two-dimensional code 50 definitely cannot be read using a reading device such as a scanning device, and thus a situation can be avoided in which the two-dimensional code 50 is read even though the fitting of the connector 1 to the mating connector 60 is incomplete.

Upon fitting the connector 1 to the mating connector 60, the operation of fitting the connector 1 to the mating connector 60 is assisted by the mating connector 60 being relatively pulled toward the connector housing 10 by the cam effect between the cam grooves 34 and the cam followers 62 as the lever 30 is turned from the fitting start position to the fitting complete position.

Figure 12:
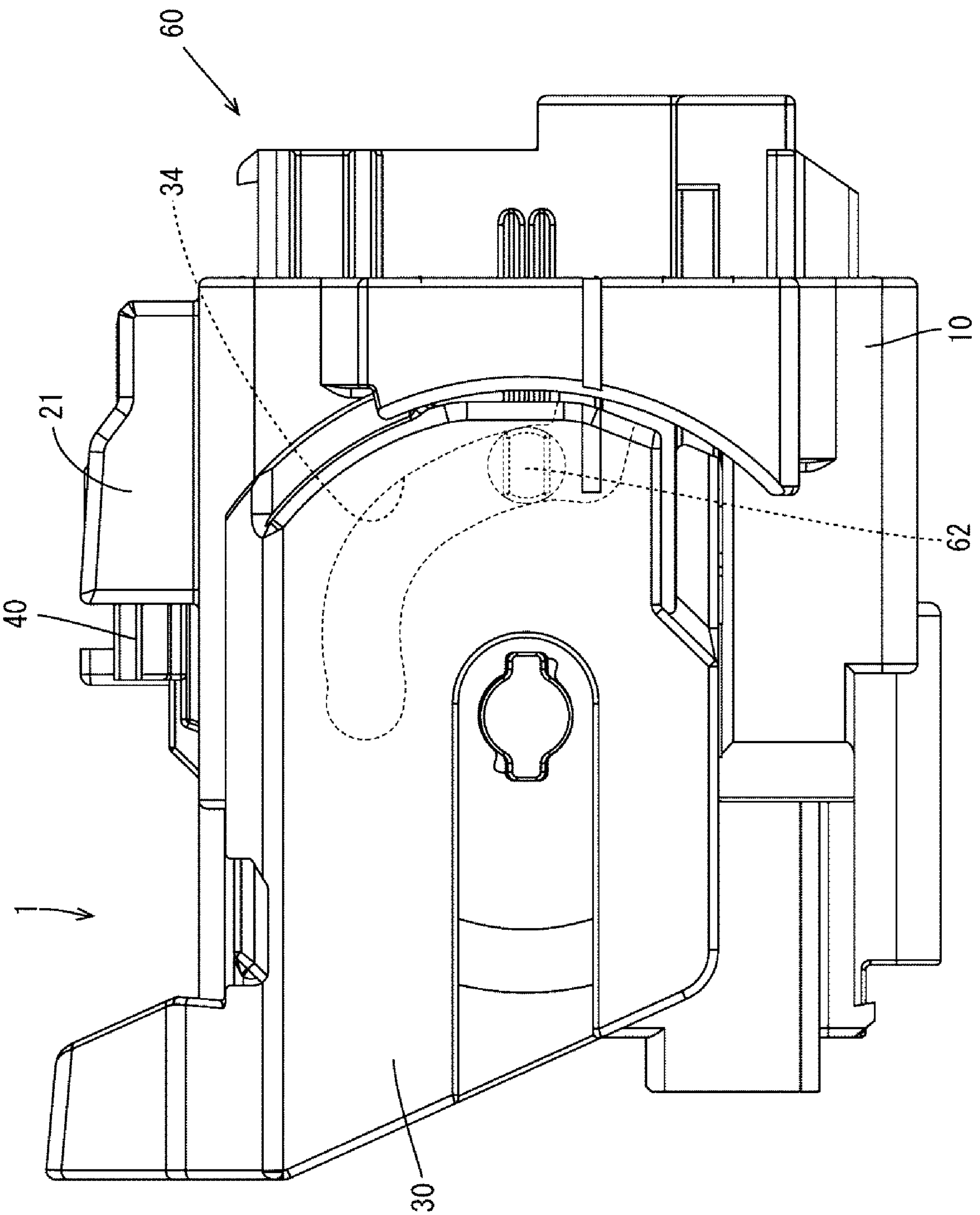
FIG. 12 is a side view illustrating an initial state of the fitting of the connector and the mating connector to one another in embodiment 1.

First, the connector 1 is fitted to the mating connector 60 shallowly. As illustrated in FIG. 12, the cam followers 62 advance into the cam grooves 34.

Figure 13:
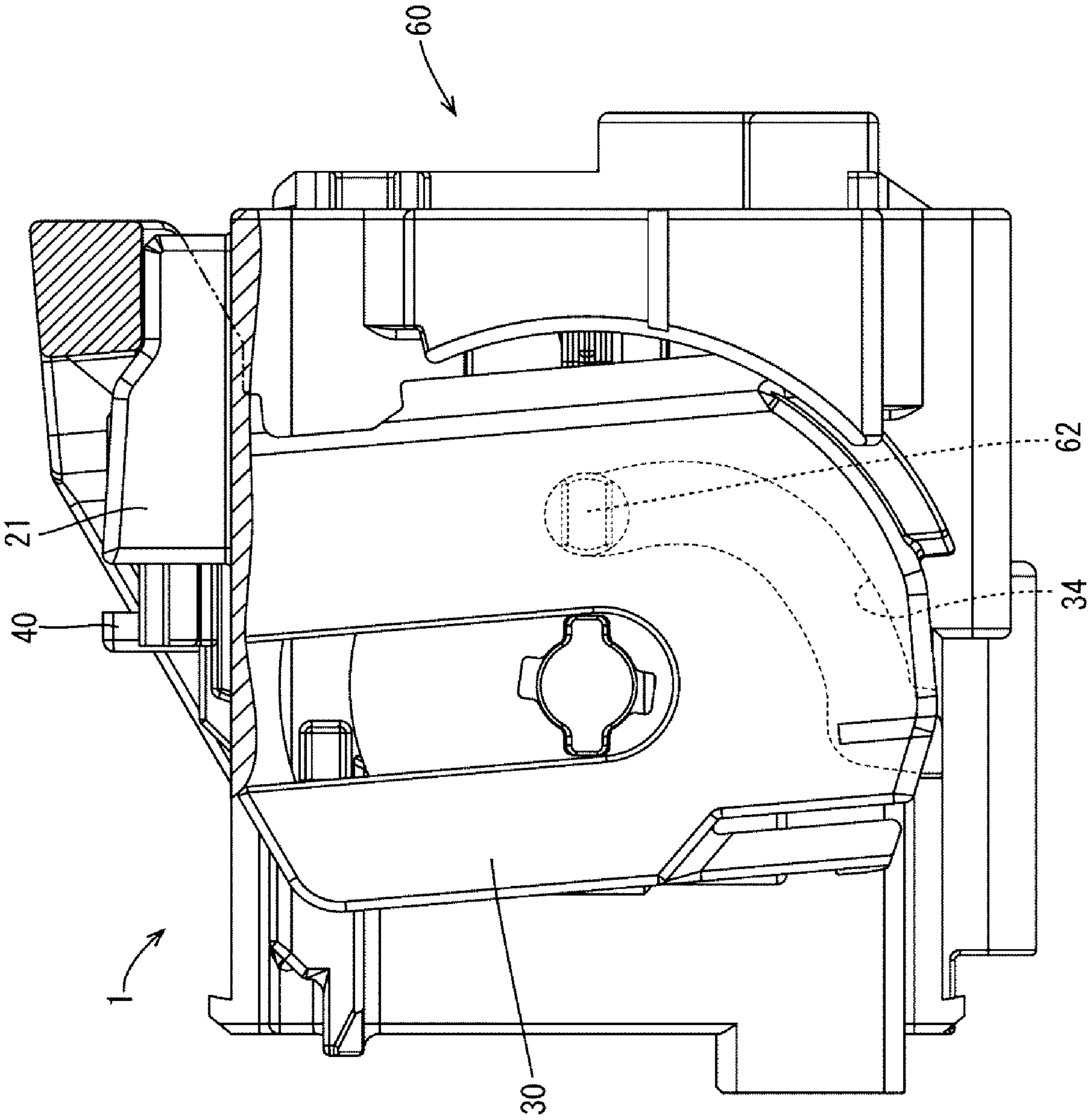
FIG. 13 is a side view illustrating a state in which the fitting of the connector and the mating connector according to embodiment 1 to one another has been completed, and the CPA member is in a standby position.
Figure 14:
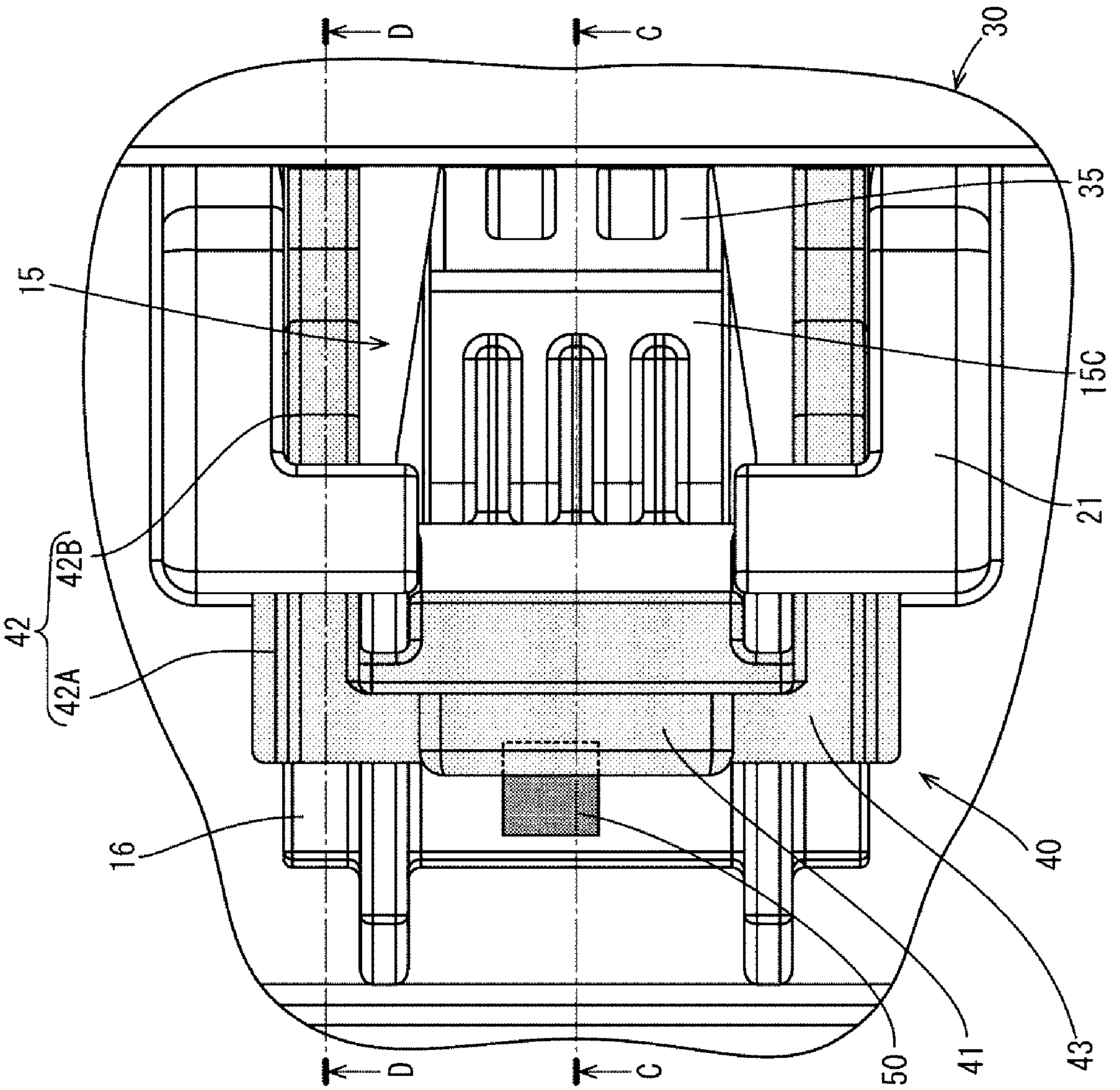
FIG. 14 is a partially enlarged plan view illustrating the state in which the fitting of the connector and the mating connector according to embodiment 1 to one another has been completed, and the CPA member is in the standby position.
Figure 15:
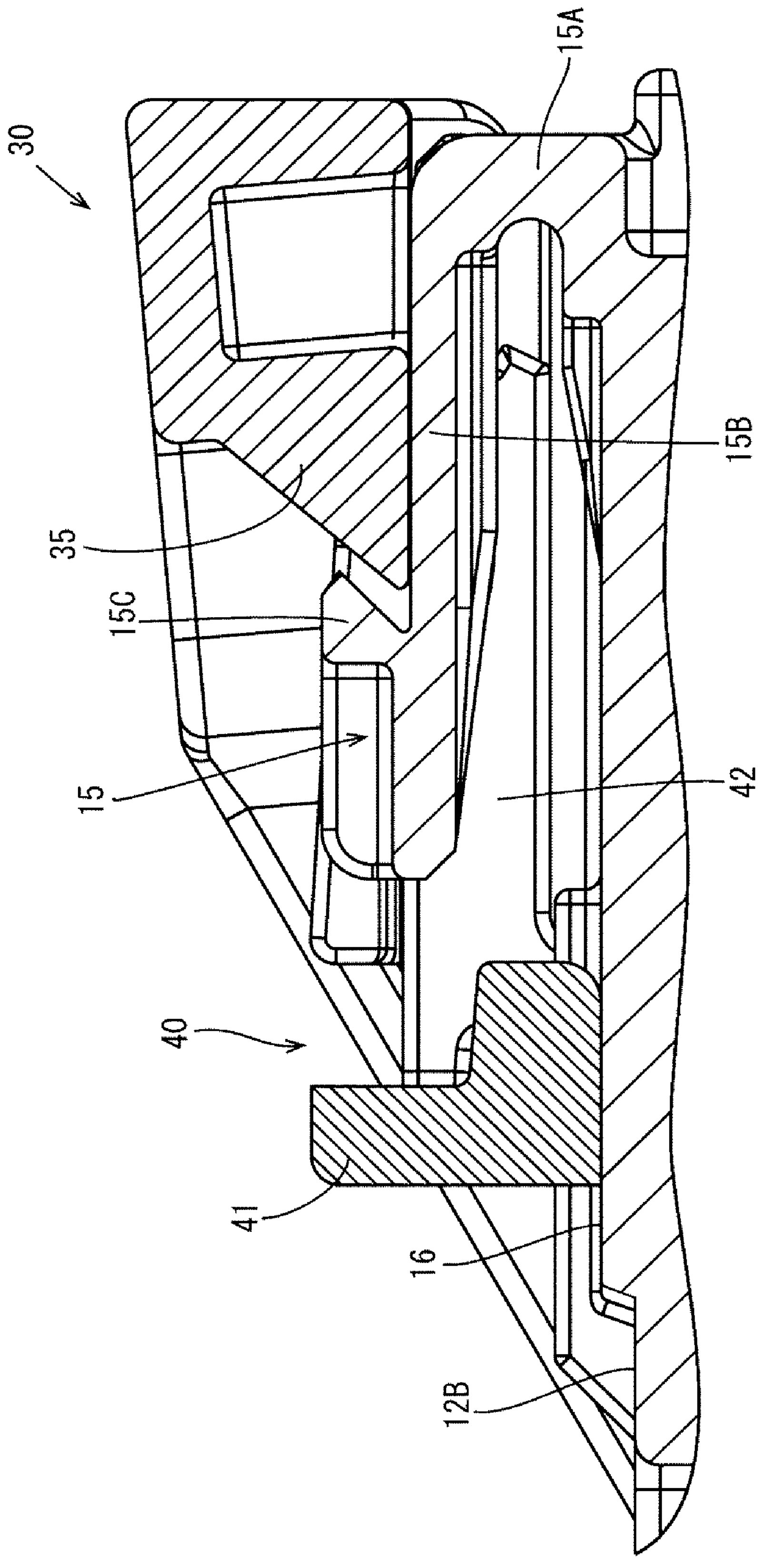
FIG. 15 is a cross-sectional view taken along line C-C in FIG. 14.

Next, the lever 30 is turned from the fitting start position toward the fitting complete position. As the lever 30 is turned, the connector housing 10 is relatively pulled toward the mating housing 61 by the cam effect based on the engagement between the cam grooves 34 and the cam followers 62. As the lever 30 approaches the fitting complete position, the lock plate 15B bends toward the mount portion 16 due to the lock claw 15C of the lock arm 15 being pushed by the lock portion 35. When the lever 30 reaches the fitting complete position, the connector housing 10 arrives at the proper fitting position relative to the mating connector 60, as illustrated in FIG. 13. Furthermore, as illustrated in FIG. 15, the lock portion 35 is positioned so as to extend along the lock arm 15 due to the lock portion 35 riding over the lock claw 15C and the lock arm 15 elastically returning to its original position. The lever 30 is retained in the fitting complete position due to the tip of the lock portion 35 engaging with the lock claw 15C.

Figure 16:
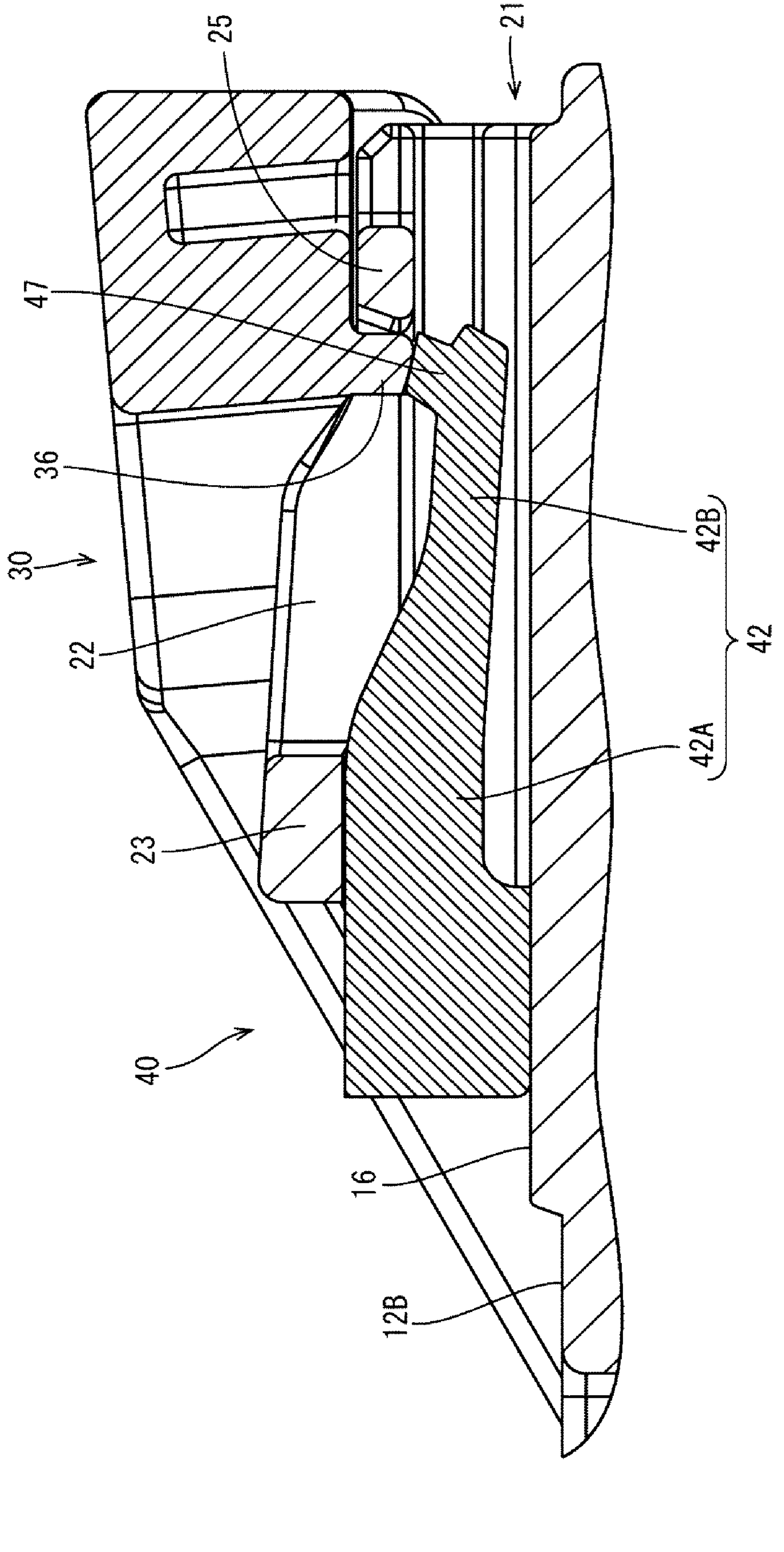
FIG. 16 is a cross-sectional view taken along line D-D in FIG. 14.

In the state in which the lever 30 has reached the fitting complete position, the two release protrusions 36 having advanced into the spaces between the two side walls 22 and the lock arm 15 press the two second restricting protrusions 47 toward the mount portion 16, as illustrated in FIG. 16. Then, the bending portions 42B bend toward the mount portion 16, allowing the second restricting protrusions 47 to pass through the spaces between the first restricting protrusions 25 and the mount portion 16. Thus, the CPA member 40 can be moved from the standby position to the fitting assurance position. In contrary to this, in a case in which the lever 30 has not reached the fitting complete position and the housing main body 10A has not arrived at the proper fitting complete position relative to the mating connector 60, the release protrusions 36 do not press the second restricting protrusions 47, and thus, the first restricting protrusions 25 interfere with the second restricting protrusions 47, resulting in the movement of the CPA member 40 to the fitting assurance position being restricted (see FIG. 4). In such a manner, it can be judged whether or not the lever 30 has been turned to the fitting complete position and the connector 1 has arrived at the proper fitting complete position relative to the mating connector 60 based on whether or not the CPA member 40 can be pushed to the fitting assurance position.

After the lever 30 has been placed in the fitting complete position, the CPA member 40 is pushed from the standby position to the fitting assurance position, as illustrated in FIG. 17. Once the CPA member 40 reaches the fitting assurance position, the CPA member 40 is restricted from moving to the standby position and is retained in the fitting assurance position due to the second restricting protrusions 47 passing through the spaces between the first restricting protrusions 25 and the mount portion 16, the bending portions 42B elastically returning to their original positions, and the second restricting protrusions 47 engaging with the first restricting protrusions 25, as illustrated in FIG. 18.

In the state in which the CPA member 40 has reached the fitting assurance position, the entire two-dimensional code 50 is exposed due to not being covered by the push operation portion 41, as illustrated in FIG. 17. Thus, the two-dimensional code 50 can be read. The completion of fitting is recorded to a recording device by this two-dimensional code 50 being read using a scanning device.

Operation and Effect

As described above, according to embodiment 1, a connector 1 includes: a connector housing 10 that includes a housing main body 10A that can be fitted to a mating connector 60, and a CPA holding portion 21 that is disposed on an outer surface of the housing main body 10A; a CPA member 40 that is attached to the CPA holding portion 21, and that can be moved from a standby position to a fitting assurance position when the housing main body 10A is in a fitting complete position relative to the mating connector 60; and a two-dimensional code 50 that is disposed on the outer surface of the housing main body 10A. A part of the two-dimensional code 50 is covered by the CPA member 40 when the CPA member 40 is in the standby position, and the entire two-dimensional code 50 is exposed when the CPA member 40 is in the fitting assurance position.

According to the above-described configuration, the two-dimensional code 50 can be read when the CPA member 40 is in the fitting assurance position, and thus the state in which the connector 1 has been properly fitted to the mating connector 60 can be accurately detected and recorded. Furthermore, when the CPA member 40 is in the standby position, the two-dimensional code 50 can be partially seen although the two-dimensional code 50 cannot be read. Thus, a worker can carry out work while checking the two-dimensional code 50 with his/her eyes, and work efficiency is improved.

Furthermore, the ratio of the area of the portion of the two-dimensional code 50 that is exposed when the CPA member 40 is in the standby position is more than 50% and 90% or less relative to the entire area of the two-dimensional code 50.

If the area of the exposed portion of the two-dimensional code 50 is more than 50%, a worker can easily check the two-dimensional code 50 with his/her eyes, and work efficiency is improved. Furthermore, if the area of the exposed portion of the two-dimensional code 50 is 90% or less, the two-dimensional code 50 definitely cannot be read using a reading device such as a scanning device, and thus a situation can be avoided in which the two-dimensional code 50 is read even though the fitting of the connector 1 to the mating connector 60 is incomplete.

Furthermore, the CPA member 40 includes a push operation portion 41 that is operated to move the CPA member 40 from the standby position to the fitting assurance position, and the two-dimensional code 50 is disposed on the outer surface of the connector housing 10 so as to be positioned adjacent to the push operation portion 41.

According to such a configuration, when moving the CPA member 40 from the standby position to the fitting assurance position, a worker can more easily carry out the work while looking at the two-dimensional code 50, and work efficiency is reliably improved.

Embodiment 2

Next, embodiment 2 will be described with reference to FIGS. 19 and 20. A connector 70 according to the present embodiment differs from embodiment 1 in that a two-dimensional code 73 (one example of the identifier) is disposed on the outer surface of a CPA member 71 (one example of the fitting assurance member). In the present embodiment, configurations that are similar to those in embodiment 1 are provided with the same reference symbols and description thereof will be omitted.

The CPA member 71 has a configuration similar to the CPA member in embodiment 1, and one of the two arms 42 has a code arrangement surface 72. The code arrangement surface 72 is the surface of the one arm 42 on the opposite side from the surface facing the mount portion 16. The two-dimensional code 73 (one example of the identifier) is disposed on the code arrangement surface 72.

Figure 19:
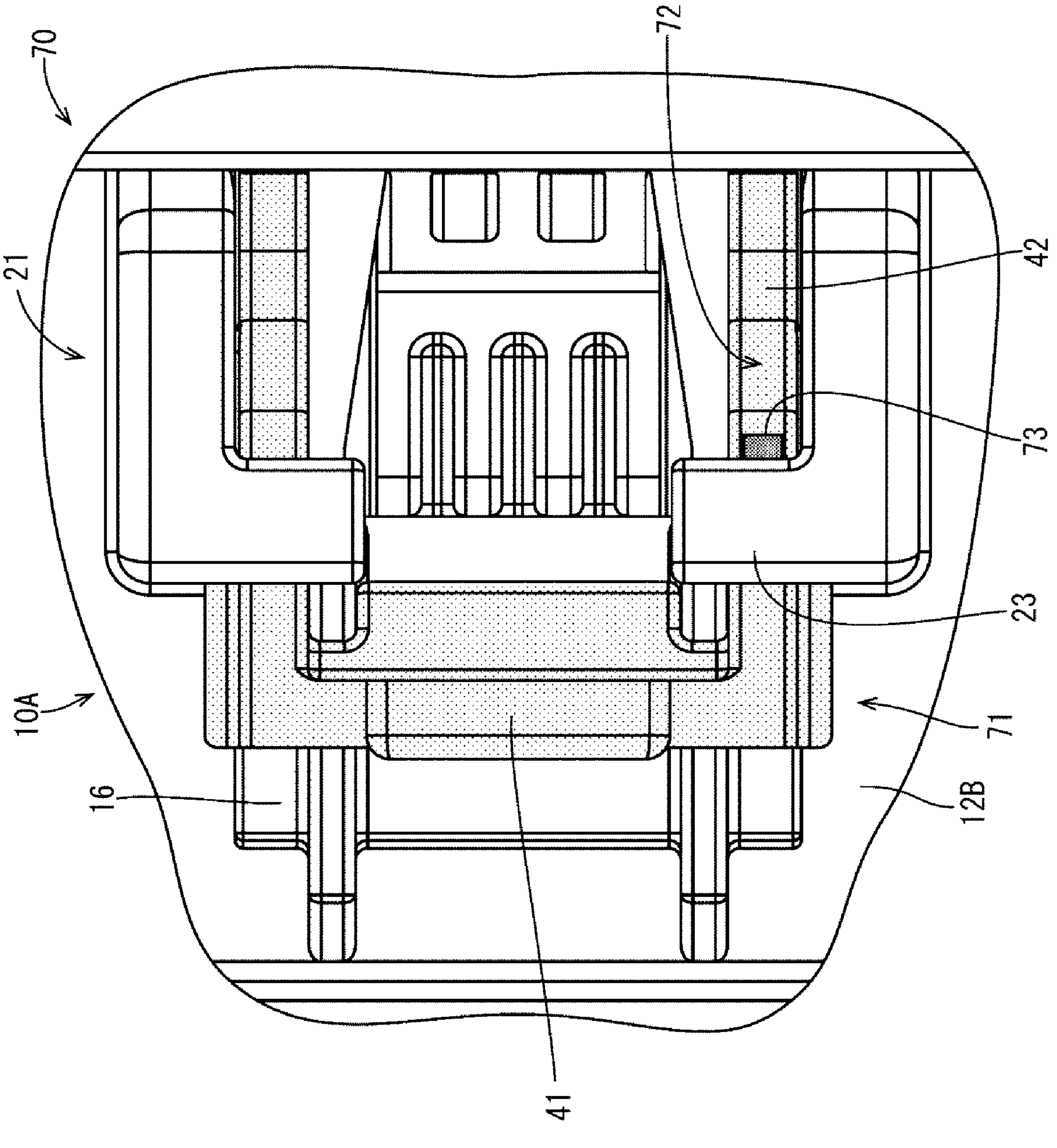
FIG. 19 is a partially enlarged plan view illustrating the state in which the fitting of the connector and the mating connector to one another has been completed, and the CPA member is in the standby position, in embodiment 2.
Figure 20:
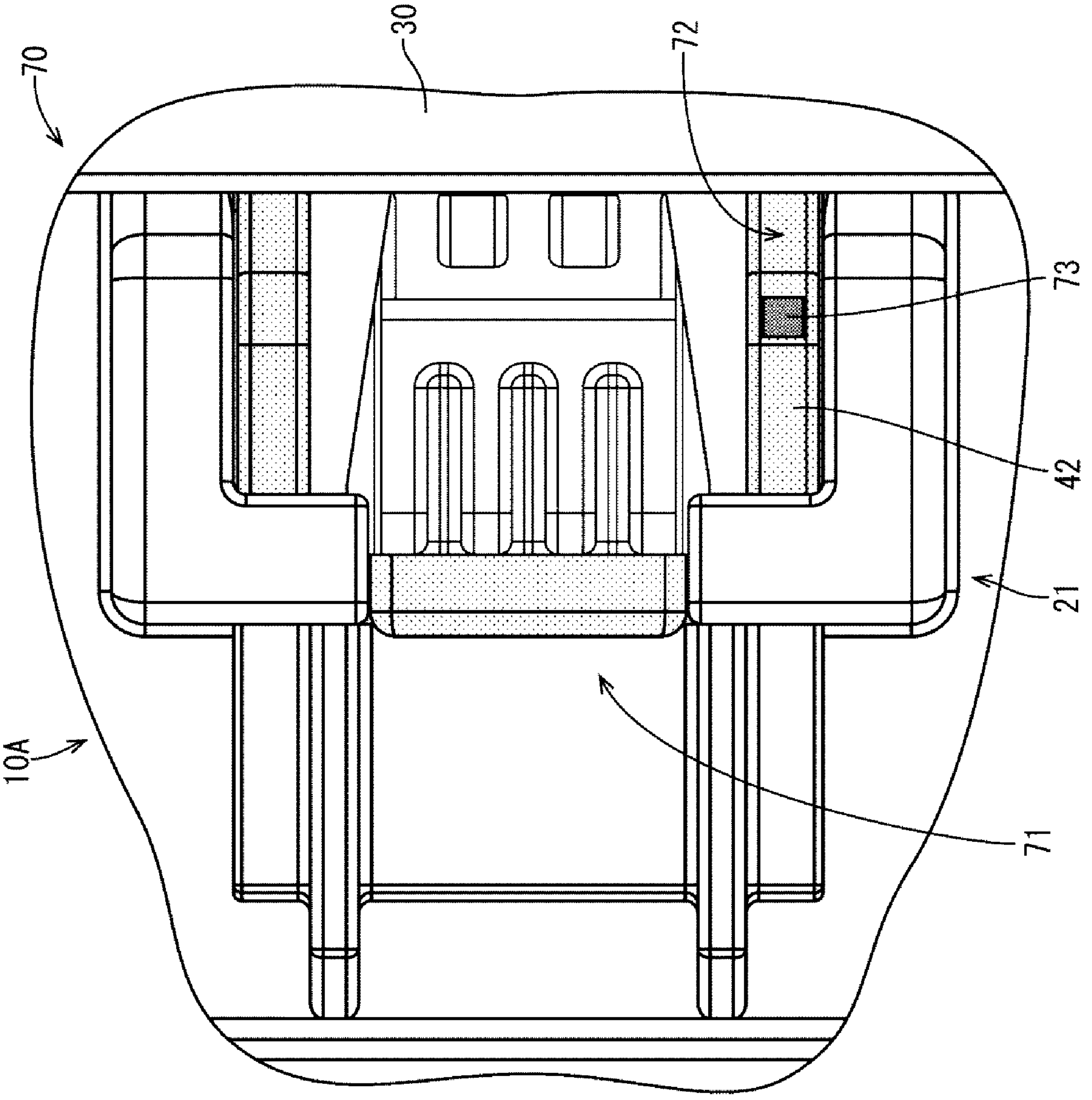
FIG. 20 is a partially enlarged plan view illustrating the state in which the fitting of the connector and the mating connector to one another has been completed, and the CPA member is in the fitting assurance position, in embodiment 2.

In a state in which the CPA member 71 is in the standby position, a holding wall 23 is positioned so as to cover a part of the code arrangement surface 72, as illustrated in FIG. 19. A part of the two-dimensional code 73 is concealed by a holding wall 23, and the remaining portion of the two-dimensional code 73 is exposed and can be seen. Similarly to embodiment 1, the ratio of the area of the exposed portion of the two-dimensional code 73 is more than 50% and 90% or less relative to the entire area of the two-dimensional code 73. In a state in which the CPA member 71 is in the fitting assurance position, the entire two-dimensional code 73 is exposed due to not being covered by the holding wall 23, as illustrated in FIG. 20. Thus, the two-dimensional code 73 can be read.

In embodiment 2, a two-dimensional code 73 is disposed on the outer surface of a CPA member 71, and a part of the two-dimensional code 73 is covered by the CPA holding portion 21 when the CPA member 71 is in the standby position, whereas the entire two-dimensional code 73 is exposed when the CPA member 71 is in the fitting assurance position. According to such a configuration as well, the state in which the connector 70 has been properly fitted to the mating connector 60 can be accurately detected and recorded because the two-dimensional code 73 can be read when the CPA member 71 is in the fitting assurance position, similarly to embodiment 1. Furthermore, when the CPA member 71 is in the standby position, the two-dimensional code 73 can be partially seen by a worker although the two-dimensional code 73 cannot be read using a reading device such as a scanning device. Thus, the worker can carry out work while checking the two-dimensional code 73 with his/her eyes, and work efficiency is improved.

Furthermore, the CPA holding portion 21 includes a holding wall 23 that holds the CPA member 71 in a state in which the CPA member 71 is sandwiched between the housing main body 10A and itself, and that covers a part of the two-dimensional code 73 when the CPA member 71 is in the standby position.

According to such a configuration, a holding wall 23 that is included in the CPA holding portion 21 and that is for holding the CPA member 71 is used to cover the two-dimensional code 73, and thus the configuration of the CPA holding portion 21 can be prevented from becoming complicated.

Other Embodiments (1) In embodiments 1 and 2 described above, the identifier was a two-dimensional code (two-dimensional codes 50 and 73). However, the identifier may be a one-dimensional code such as a bar code, one or more characters, numerals, figures, projections/recesses, or any combination thereof.

(2) In embodiments 1 and 2 described above, the housing main body 10A included the mount portion 16. However, the housing main body need not include a mount portion.

(3) In embodiments 1 and 2 described above, the connector (connectors 1 and 70) included a lever. However, the connector need not include a lever.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a connector housing that includes a housing main body that can be fitted to a mating connector, and a holding portion that includes a guide rail and is disposed on an outer surface of the housing main body and is configured to be slidingly movable along the guide rail in parallel with the outer surface of the housing main body;

a fitting assurance member that is attached to the holding portion and is configured to be moved from a standby position to a fitting assurance position when the housing main body is in a fitting complete position relative to the mating connector; and an identifier that is disposed on the outer surface of the housing main body, the identifier being partly covered by the fitting assurance member when the fitting assurance member is in the standby position and being entirely exposed when the fitting assurance member is in the fitting assurance position.

2. The connector according to claim 1, wherein only a portion of the identifier is exposed when the fitting assurance member is in the standby position, and the portion of the identifier that is exposed when the fitting assurance member is in the standby position is more than 50% and 90% or less than the entire area of the identifier.

3. The connector according to claim 1, wherein the fitting assurance member comprises an operation portion that is operated to move the fitting assurance member from the standby position to the fitting assurance position and is configured to cover a part of the identifier when the fitting assurance member is in the standby position, and the identifier is disposed on the outer surface of the housing main body so as to be positioned adjacent to the operation portion.

4. A connector comprising:

a connector housing that includes a housing main body that can be fitted to a mating connector, and a holding portion that includes a guide rail and is disposed on an outer surface of the housing main body and is configured to be slidingly movable along the guide rail in parallel with the outer surface of the housing main body;

a fitting assurance member that is attached to the holding portion and is configured to be moved from a standby position to a fitting assurance position when the housing main body is in a fitting complete position relative to the mating connector; and an identifier that is disposed on an outer surface of the fitting assurance member, the identifier being partly covered by the holding portion when the fitting assurance member is in the standby position and being entirely exposed when the fitting assurance member is in the fitting assurance position.

5. The connector according to claim 4, wherein only a portion of the identifier is exposed when the fitting assurance member is in the standby position, and the portion of the identifier that is exposed when the fitting assurance member is in the standby position is more than 50% and 90% or less than the entire area of the identifier.

6. The connector according to claim 4, wherein the holding portion comprises two holding walls configured to sandwich the fitting assurance member between the two holding walls in order to hold the fitting assurance member toward the housing main body, and to cover a part of the identifier when the fitting assurance member is in the standby position, and the identifier is disposed on the outer surface of the fitting assurance member so as to be adjacent the one of the two holding walls.

7. The connector according to claim 6, wherein the holding portion further comprises two side walls that are respectively connected to one end of either of the two holding walls and that extend parallel to a moving direction of the fitting assurance member, each of the two holding walls extends inwardly toward one of the two side walls, and one of the two holding walls covers the part of the identifier when the fitting assurance member is in the standby position.

* * * * *